US012809698B2

(12) United States Patent
Jooma et al.

(10) Patent No.: US 12,809,698 B2
(45) Date of Patent: Nov. 24, 2026

(54) GENERATING AND EDITING DIGITAL REPORTS VIA INTEGRATION OF SEPARATE SOFTWARE COMPUTING APPLICATIONS AND DATA EXTRACTION

(71) Applicant: OneTrust LLC, Atlanta, GA (US)

(72) Inventors: Sohail Jooma, Sandy Springs, GA (US); Daniel B Quintas, Smyrna, GA (US)

(73) Assignee: One Trust LLC, Atlanta, GA (US)

(*) Notice: Subject to any disclaimer, the term of this patent is extended or adjusted under 35 U.S.C. 154(b) by 249 days.

(21) Appl. No.: 18/420,412

(22) Filed: Jan. 23, 2024

(65) Prior Publication Data

US 2025/0238606 A1 Jul. 24, 2025

(51) Int. Cl.

| | |
|---|---|
| ***G06F 9/54*** | (2006.01) |
| ***G06F 3/0482*** | (2013.01) |
| ***G06F 3/0484*** | (2022.01) |
| ***G06F 9/445*** | (2018.01) |
| ***G06F 40/103*** | (2020.01) |
| ***G06F 40/186*** | (2020.01) |

(52) U.S. Cl.

CPC ............ *G06F 9/543* (2013.01); *G06F 3/0482* (2013.01); *G06F 3/0484* (2013.01); *G06F 9/44526* (2013.01); *G06F 40/103* (2020.01); *G06F 40/186* (2020.01)

(58) Field of Classification Search

CPC .... G06F 40/18; G06F 40/186; G06F 9/44526; G06F 9/54; G06F 9/543; G06F 3/0482; G06F 3/0484; G06F 40/103; G06F 3/04842; G06V 30/416; G06V 30/42

See application file for complete search history.

(56) References Cited

U.S. PATENT DOCUMENTS

| | | | | |
|---|---|---|---|---|
| 12,135,934 | B2 * | 11/2024 | Werr | G06F 16/1767 |
| 2009/0025016 | A1 * | 1/2009 | Crucs | G06F 40/106 719/329 |
| 2011/0276867 | A1 * | 11/2011 | Machalek | G06F 40/18 715/212 |
| 2018/0348979 | A1 * | 12/2018 | Hansbrough | G06F 3/0486 |
| 2020/0364757 | A1 * | 11/2020 | Tang | H04L 67/34 |

(Continued)

*Primary Examiner* — Nicholas Ulrich

(74) *Attorney, Agent, or Firm* — Ballard Spahr LLP

(57) ABSTRACT

Methods, systems, and non-transitory computer readable storage media are disclosed for facilitating digital report generation across separate software computing applications via application and digital data extraction integration. The disclosed system utilizes integrated software computing applications to perform cross-application tasks to generate and edit digital reports. The disclosed system provides tools within a data management software application to create a digital report from data objects generated from data extracted from digital data repositories associated with an entity. In response to a request via the data management software application, the disclosed system performs operations to launch a digital content editing application displaying a digital report template including the data represented by the data objects. In response to launching the digital content editing application, the disclosed system causes the digital content editing application to open a panel with tools corresponding to the data management software application for editing the digital report template.

20 Claims, 12 Drawing Sheets

(56) References Cited

U.S. PATENT DOCUMENTS

2024/0104521 A1* 3/2024 Azgad-Tromer .................... G06Q 20/4016
2024/0249070 A1* 7/2024 Rattan .................... G06F 9/466

* cited by examiner

GENERATING AND EDITING DIGITAL REPORTS VIA INTEGRATION OF SEPARATE SOFTWARE COMPUTING APPLICATIONS AND DATA EXTRACTION

BACKGROUND

Advances in computer processing and data storage technologies have led to significant advances in the use of computing processes to manage operations in many industries. For instance, many entities utilize computing devices to track data assets, data processing operations, digital data records, etc., via various metrics for reporting in connection with various regulations and frameworks. In particular, these entities are often required to perform various operations within certain constraints. More specifically, various governing bodies often establish requirements including internal or external requirements for handling data or performing operations according to various legal, ethical, or security/privacy standards.

Generating and editing digital reports for operations associated with an entity can often be a challenging task due to the number of different systems and devices and the amount of data involved in performing the operations of the entity. To illustrate, many entities use various software and hardware components (e.g., different servers, user devices, software computing applications) to transmit, process, store, collect, and compile digital data representing entity operations. Accordingly, communicating with such software and hardware components to access and retrieve information relevant to generate a digital report (e.g., indicating how well an entity's operations are complying with the one or more standards) can be a time consuming process. Generating such reports in a timely manner can also be critical to adapting the entity's operations (e.g., in hardware or software computing components) to be in compliance with the various standards, such as to avoid security and privacy issues when handling specific data types (e.g., personally identifiable information) or in managing physical components such as vehicle maintenance.

Furthermore, conventional systems that generate digital reports on entity operations involving many components typically require many processing activities to ensure that the data is accurate-usually via operations performed at third-party computing systems. Additionally, this can further slow the process as the third-party computing systems communicate with many different software/hardware components of the entity. Thus, conventional reporting systems that generate digital reports involving many different software/hardware components are often inefficient and inaccurate and utilize rigid document processing operations. Inefficiencies in the conventional systems can also lead to non-compliance issues in length digital report generation processes due to the complex and changing nature of the requirements of various regulations and frameworks.

SUMMARY

This disclosure describes various aspects for facilitating digital report generation across separate software computing applications via application and digital data extraction integration. For example, the disclosed systems utilize integrated software computing applications to perform cross-application tasks to generate and edit digital reports. Specifically, the disclosed systems provide tools within a data management software application at a client device to automatically create a digital report from data objects generated from data extracted from digital data repositories associated with an entity. Additionally, in response to a request to generate a digital report within the data management software application, the disclosed systems perform operations to launch a digital content editing application displaying a digital report template including the data represented by the data objects. Furthermore, in response to launching the digital content editing application, the disclosed systems cause the digital content editing application to open a panel (e.g., an add-in panel) with tools corresponding to the data management software application for further editing the digital report template, such as by accessing the data objects representing the extracted data. The disclosed systems thus integrate separate software computing applications with data extraction software to efficiently and accurately generate dynamic digital reports.

BRIEF DESCRIPTION OF THE DRAWINGS

Various aspects will be described and explained with additional specificity and detail through the use of the accompanying drawings.

DETAILED DESCRIPTION

Figure 1:
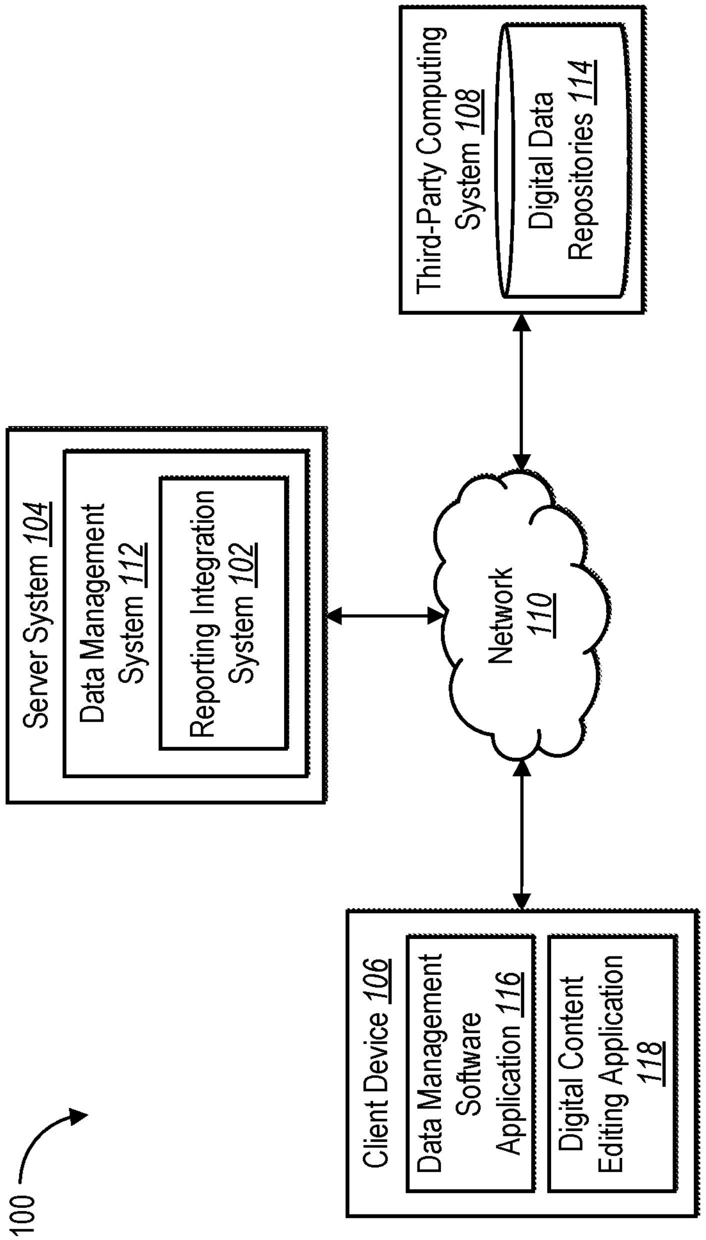
FIG. 1 illustrates an example of a system environment in which a reporting integration system can operate in accordance with some aspects.

This disclosure describes various aspects of a reporting integration system that facilitates digital report generation across separate software computing applications via application and digital data extraction integration. For example, the reporting integration system integrates a data management software application with one or more digital data repositories (e.g., via a data extraction software application) to generate data objects representing data at the repositories. Additionally, the reporting integration system integrates the data management software application with a digital content editing application to automatically generate a digital report template based on the data objects representing the extracted data and launch the digital content editing application to display the digital report template in response to a single user interaction. Furthermore, in response to launching the digital content editing application, the reporting integration system provides tools within the digital content editing application (e.g., by causing the application to open a panel with the tools) for obtaining data from the data management software application. Accordingly, the reporting integration system integrates the separate software computing applications to extract data from digital data repositories to use in managing the data (e.g., within the data management software application) and generating and editing digital reports (e.g., within the digital content editing application).

As mentioned, in some aspects, the reporting integration system accesses data objects representing data extracted from one or more digital data repositories associated with an entity. In particular, the reporting integration system can be part of a data management system that utilizes a data extraction software application to extract data from the one or more digital data repositories of the entity. Additionally, the data management system generates data objects representing the data (e.g., representing data assets, data processing activities, files, or other entities) and stores the data objects for access by the reporting integration system.

In some aspects, the reporting integration system communicates with the data management system to retrieve data objects and present corresponding data within a data management software application. Additionally, the reporting integration system causes the data management software application to communicate with (e.g., launch and provide data to) a digital content editing application to display information relevant to a digital report. More specifically, in response to a request via the data management software application to generate a digital report, the reporting integration system generates a digital report template utilizing data objects and launches the digital content editing application to present the digital report template. To illustrate, the reporting integration system utilizes a machine-learning model to generate the digital report template. In connection with launching the digital content editing application, the reporting integration system also causes the digital content editing application to open a panel (e.g., an add-in panel) including tools related to the data management software application.

In additional aspects, the reporting integration system provides tools within the panel of the digital content editing application to edit the digital report template. In particular, the reporting integration system can provide tools to add or replace data in the digital report template utilizing the data objects generated from extracted data associated with the entity. For example, the reporting integration system can cause the digital content editing application to display information related to the digital report template or to other data from the data management software application. The reporting integration system can also cause the digital content editing application to communicate with the data management software application in response to a request to add data to the digital report template and extract attributes from one or more data objects to insert into the digital report template according to one or more formats (e.g., charts or graphs).

In some aspects, the reporting integration system improves upon shortcomings of conventional systems in relation to managing computing systems that provide data management and reporting for an entity. As mentioned, the number of computing systems typically involved in performing various operations for an entity can be large. In contrast to conventional systems that involve many processing activities communicating with many different devices for reporting on such operations, the reporting integration system provides tools to dynamically generate digital reports by leveraging data extraction processes on entity data. Specifically, the reporting integration system (e.g., via a data management system) retrieves data objects representing extracted data for an entity to facilitate an integration between a data management software application and a digital content editing application. Accordingly, the reporting integration system links tools and computing operations related to digital report generation across a plurality of software computing applications.

Additionally, in some aspects, the reporting integration system provides improved graphical user interfaces for generating and editing digital reports involving different software computing operations. In contrast to conventional systems that require users to separately access and use a number of different software computing applications to perform various operations associated with generating digital reports, the reporting integration system integrates a plurality of software computing applications to merge tools and operations across the software computing applications. More specifically, the reporting integration system provides tools to cause a digital content editing application to display a digital report template with tools that access a data management software application in response to a single interaction within the data management software application (e.g., a single button click). The reporting integration system thus consolidates data and operations from a plurality of graphical user interfaces and software computing applications into a single graphical user interface, reducing the number of operations and graphical user interfaces required to access the data and operations over conventional systems. Furthermore, the reporting integration system leverages data extraction processes that generate data objects representing entity data to facilitate the integration of the software computing applications and graphical user interface tools. In further contrast to conventional systems that utilize separate interfaces and/or applications for digital reporting operations, the reporting integration system utilizes integrated applications/systems to leverage data objects and relationships between the data objects to provide detailed and granular information with interactive tools for generating and editing digital reports regarding data assets and data processing operations involved in an entity's operations.

In some aspects, the reporting integration system also improves the efficiency and accuracy of digital report generation through the user of machine-learning. In particular, the reporting integration system utilizes machine-learning models (e.g., generative machine-learning models) to generate digital report templates that incorporate extracted data from digital data repositories into one or more digital content editing applications by leveraging data objects representing the extracted data. Additionally, by utilizing machine-learning models to generate the digital report templates, the reporting integration system can efficiently generate digital content that includes relevant and accurate data associated with an entity's operations while also including natural language prose and consistent content structure. Furthermore, the reporting integration system can utilize machine-learning models with data objects representing extracted data to convert unstructured and unlabeled data from a number of different computing devices to create digital reports that include a mixture of structured/labeled data and unstructured/unlabeled data. Turning now to the figures, FIG. 1 includes an example of a system environment 100 in which a reporting integration system 102 is implemented. In particular, the system environment 100 includes a server system 104, a client device 106, and a third-party computing system 108 in communication via a network 110. In some aspects, the server system 104 includes a data management system 112, which further includes the reporting integration system 102. The third-party computing system 108 includes digital data repositories 114. The client device 106 includes a data management software application 116 and a digital content editing application 118.

In some aspects, the server system 104 include or host the reporting integration system 102. Specifically, the reporting integration system 102 includes, or is part of, one or more systems (e.g., the data management system 112) that process digital data from the digital data repositories 114 (e.g., by communicating with the third-party computing system 108). For example, the data management system 112 provides tools to the client device 106 for managing data associated with an entity or for performing various data processes for the entity. In some aspects, the data management system 112 provides tools to the client device 106 via the data management software application 116 for viewing and managing information associated with data that the entity handles. To illustrate, the data management system 112 provides tools for managing data associated with various data assets, data processing operations, or other operations corresponding to the entity via data stored at the digital data repositories 114 of the third-party computing system 108. In some aspects the data management system 112 also generates data objects representing the data stored at the digital data repositories 114 to use in managing information associated with the data.

As used herein, the term "data management software application" refers to a computing application that provides tools and interfaces for managing data associated with an entity. In particular, as mentioned, the data management software application 116 can provide tools for viewing and managing data associated with an entity. For example, the data management software application 116 includes tools to manage compliance of the data and operations in connection with various standards or frameworks and/or controls for the data. A data management software application can include an application executed in a web browser or in a standalone application.

As used herein, the term "data object" refers to a digital object for tracking or managing systems, software, data sources, entities, or other functions or infrastructure involved in handling specified data for an entity. For example, a data object can include a digital representation of the entity itself, a sub-entity such as subsidiary of the entity, a business unit of the entity, an entity operation within a computing environment or outside a computing environment, a data asset, a project, a machine-learning model, a dataset, a data asset, or a computing operation such as a data process. In some aspects, a data object represents data (e.g., a digital entity) extracted from the digital data repositories 114 in connection with implementing or executing one or more machine-learning models in an artificial intelligence computing application. For example, a data object includes a digital file with attribute values corresponding to a dataset, a data asset, a data processing operation, or a digital representation of an operation associated with an entity. Accordingly, in some aspects, the reporting integration system 102 generates and stores data objects of different types (e.g., model objects, dataset objects, project objects) based on the corresponding digital entities extracted from the digital data repositories 114.

In some aspects, data represented by data objects refers to a digital entity, which can include a computer file or a group of computer files. For example, a digital entity can include one or more computer files in a database. Additionally, a digital entity can include one or more computer files in a computing application, script, or executable. To illustrate, a digital entity can include one or more computer files involved in implementing a data processing operation, data representing a data asset, computer files in a dataset accessed or generated by a data processing operation, computer files of an application or other data asset having access to a data processing operation, etc.

As used herein, the term "data asset" refers to computing hardware or computing software. As used herein, the term "data processing operation" refers to executable code to perform a processing step within computing software (e.g., via one or more software computing applications). For example, a data processing operation includes a single line of code or a plurality of lines of code to access (e.g., send data to or receive data from) a data asset.

As used herein, the term "machine-learning model" refers to a computer representation that is tuned (e.g., trained) based on inputs to approximate unknown functions. For instance, a machine-learning model could include a neural network having one or more layers or artificial neurons that approximate unknown functions by analyzing known data at different levels of abstraction. In some aspects, a machine-learning model includes one or more neural network layers including, but not limited to, a deep learning model, a convolutional neural network, a transformer neural network, a recurrent neural network, a fully-connected neural network, a classification neural network, or a combination of a plurality of neural networks and/or neural network types. In one or more aspects, a machine-learning model includes a generative neural network that generates digital text and/or digital image content to include in a digital document based on data objects representing data extracted from the digital data repositories 114.

In connection with managing data of an entity via the data management system 112, the reporting integration system 102, which can be part of the data management system 112, provides tools for generating digital reports on the data of the entity. In particular, the reporting integration system 102 generates digital reports in digital documents such as, but not limited to, text documents, spreadsheets, flowcharts, or slide presentations. Accordingly, the reporting integration system 102 communicates with the client device 106 to provide tools to generate digital reports (e.g., via integration of the data management software application 116 and the digital content editing application 118). In some aspects, the term "digital content editing application" refers to a computing application that provides tools and interfaces for viewing and editing digital reports in one or more formats for data associated with an entity. Specifically, the digital content editing application 118 can provide tools for accessing data objects representing data of an entity by communicating with the data management software application 116. A digital content editing application can include an application executed in a web browser or in a standalone application.

In some aspects, a standard, regulation, law, or framework includes a set of requirements for handling data (e.g., digital data or non-digital data), performing operations, or other aspects of an entity. For example, a standard, regulation, law, or framework includes requirements in connection with handling certain data types in various environments. To illustrate, a "regulatory framework" includes specific requirements for handling data in view of a set of practices established by the International Organization for Standardization ("ISO"), internally by a particular organization (e.g., a multinational corporation), or a territory government (e.g., the European Union).

As mentioned, the data management system 112 (including the reporting integration system 102) can generate and manage data objects by communicating with the third-party computing system 108. Specifically, the data management system 112 can communicate with the third-party computing system 108 to generate data objects and/or to determine or otherwise obtain information associated with the data objects. In some aspects, the client device 106 controls or uses the third-party computing system 108 for the entity. The data management system 112 can communicate with the digital data repositories 114 at the third-party computing system 108 on behalf of the entity via an integration that is configured with the entity's credentials (e.g., via data extraction software application integrated with the digital data repositories 114). The data management system 112 can obtain metadata or other information about the infrastructure or functions used by the entity and thereby populate attributes of the data objects with this information.

In one or more aspects, the term "data extraction software application" refers to a computing application that operates on a computing device to extract data from the computing device or another computing device. In one example, the reporting integration system 102 includes a data extraction software application to access the digital data repositories 114 at the third-party computing system 108 utilizing credentials (e.g., login information, tokens) and extract (e.g., obtain) data including files, directories, or data within files. Additionally or alternatively, the reporting integration system 102 utilizes a data extraction software application to install one or more scripts, functions, or components of the data extraction software application at one or more other computing devices (e.g., the digital data repositories 114 and/or the third-party computing system 108). Thus, the reporting integration system 102 can integrate with the digital data repositories 114 at the third-party computing system 108 via the data extraction software application.

In some aspects, the third-party computing system 108 include server devices, individual client devices, or other computing devices associated with an entity. For instance, a third-party computing system includes one or more computing devices for performing operations associated with an entity. To illustrate, the third-party computing system 108 includes one or more server devices that generate, process, store, or transmit payment card processing data subject to PCI DSS in one or more jurisdictions. In another example, the third-party computing system 108 includes one or more server devices that generate, process, store, or transmit data related to entity operations covered by various ESG standards.

In some aspects, the server system 104 include a variety of computing devices, including those described below with reference to FIG. 12. For example, the server system 104 includes one or more servers for storing and processing data associated with one or more entities. In some aspects, the server system 104 also include a plurality of computing devices in communication with each other, such as in a distributed storage environment. In some aspects, the server system 104 include a content server. The server system 104 also optionally includes an application server, a communication server, a web-hosting server, a social networking server, a digital content campaign server, or a digital communication management server.

In some aspects, the client device 106 includes, but is not limited to, a desktop, a mobile device (e.g., smartphone or tablet), or a laptop including those explained below with reference to FIG. 12. Furthermore, although not shown in FIG. 1, the client device 106 can be operated by users (e.g., a user included in, or associated with, the system environment 100) to perform a variety of functions. In particular, the client device 106 performs functions such as, but not limited to, accessing, viewing, and interacting with data associated with entity operations. In some aspects, the client device 106 also performs functions for generating, capturing, or accessing data to provide to the data management system 112 and/or the reporting integration system 102 in connection with managing data and generating digital reports. For example, the client device 106 communicates with the server system 104 via the network 110 to provide information (e.g., user interactions) associated with entity data. Although FIG. 1 illustrates the system environment 100 with a single client device, in some aspects, the system environment 100 includes a plurality of client devices. In some aspects, the client device 106 or another system hosts the digital data repositories 114.

Additionally, as shown in FIG. 1, the system environment 100 includes the network 110. The network 110 enables communication between components of the system environment 100. In some aspects, the network 110 may include the Internet or World Wide Web. In additional or alternative aspects, the network 110 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server system 104, the client device 106, and the third-party computing system 108 communicate via the network using one or more communication platforms and technologies suitable for transporting data and/or communication signals, including any known communication technologies, devices, media, and protocols supportive of data communications, examples of which are described with reference to FIG. 12.

Although FIG. 1 illustrates the server system 104, the client device 106, the digital data repositories 114, and the third-party computing system 108 communicating via the network 110, in additional or alternative aspects, the various components of the system environment 100 communicate and/or interact via other methods (e.g., the server system 104, the client device 106, the digital data repositories 114, and/or the third-party computing system 108 can communicate directly). Furthermore, although FIG. 1 illustrates the reporting integration system 102 and the digital data repositories 114 being implemented separately within the system environment 100, the reporting integration system 102 can alternatively be implemented, in whole or in part, by a particular component and/or device within the system environment 100 (e.g., the server system 104). Additionally or alternatively, the third-party computing system 108 can include the client device 106. In some aspects, the digital data repositories 114 are stored at the server system 104, the client device 106, or at a different device or system.

In some aspects, the server system 104 can support the reporting integration system 102 on the client device 106. For instance, the server system 104 generates/maintains the reporting integration system 102 and/or one or more components of the data management system 112 and the reporting integration system 102 for the client device 106. The server system 104 provides the data management system 112 and the reporting integration system 102 to the client device 106 (e.g., as part of a software application/suite). In other words, the client device 106 obtains (e.g., downloads) the data management system 112 and the reporting integration system 102 from the server system 104. At this point, the client device 106 is able to utilize the data management system 112 and the reporting integration system 102 to manage data of an entity independently from the server system 104.

In additional or alternative aspects, the data management system 112 and/or the reporting integration system 102 include a web hosting application that allows the client device 106 to interact with content and services hosted on the server system 104. To illustrate, in some aspects, the client device 106 accesses a web page supported by the server system 104. The client device 106 provides input to the server system 104 to perform data management operations, and, in response, the reporting integration system 102 on the server system 104 performs operations to view/manage data associated entity operations. The server system 104 provide the output or results of the operations to the client device 106.

Figure 2:
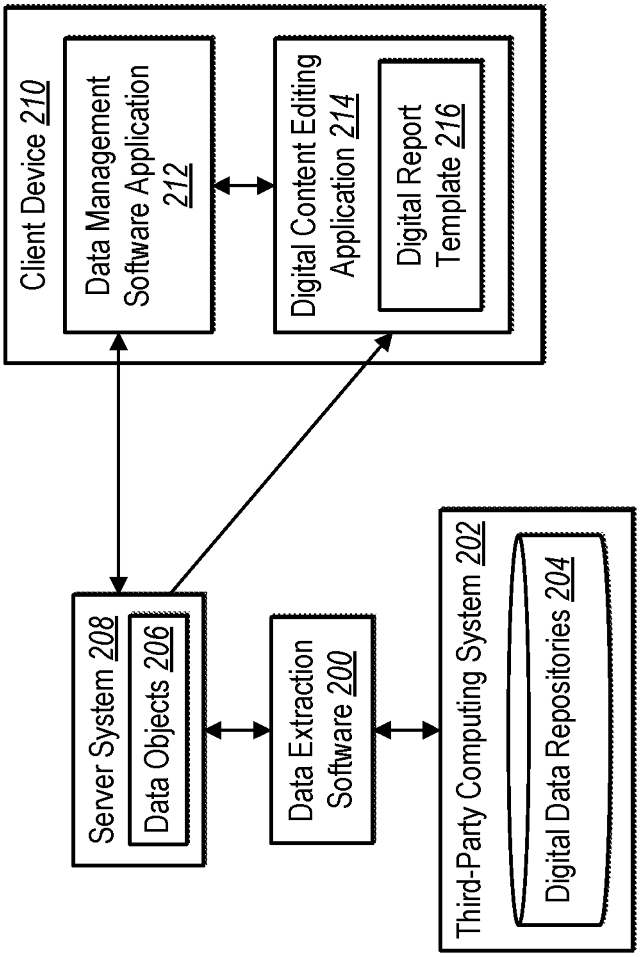
FIG. 2 illustrates an example of the reporting integration system integrating software computing applications with data extraction software in accordance with some aspects.

As mentioned, the data management system 112 provides data management for an entity, and the reporting integration system 102 provides digital report generation/editing based on data of the entity. FIG. 2 illustrates an example of the data management system 112 and the reporting integration system 102 extracting data associated with an entity and utilizing the data to generate digital reports. In particular, FIG. 2 illustrates that the data management system 112 and the reporting integration system 102 integrate with a plurality of software computing applications to provide integrated data management and digital report generation/editing operations.

In some aspects, as illustrated in FIG. 2, the data management system 112 utilizes data extraction software 200 to extract data from a third-party computing system 202. For example, the data management system 112 utilizes the data extraction software 200 to access data stored at the digital data repositories 204. Accordingly, the data management system 112 can utilize the data extraction software 200 to identify computing files that represent (e.g., store information related to) various components of entity operations, such as data assets (e.g., hardware or software applications), data processing operations (executables, scripts), metadata, digital documentation representing non-digital operations, other datasets, etc.

In some aspects, the data extraction software 200 includes a data extraction software application installed at the third-party computing system 202 or otherwise having access to the third-party computing system 202. For example, the data management system 112 provides the data extraction software application to the third-party computing system 202 (or to a client device with access to the digital data repositories 204) for installation. The computing device on which the data extraction software application is installed executes the application to process data at the digital data repositories 204 by scanning the digital data repositories 204 for computer files, classifying/labeling the computer files, and providing information (e.g., classifications or labels) to the data management system 112.

In some aspects, the data management system 112 generates data objects 206 to represent the data extracted from the digital data repositories 204 at the third-party computing system 202. For instance, the data management system 112 generates a data object to represent each component involved in the operations of the entity. Specifically, the data management system 112 generates a data object to represent each data asset, data processing operation, dataset, etc. In some aspects, the data management system 112 also generates and stores data indicating relationships between data objects, such as by generating a knowledge graph linking related data objects (e.g., representing related data assets and/or data processing operations) or by generating evidence objects that link related data objects. Additionally, the data management system 112 can store the data objects at a server system 208 (e.g., the server system 104 of FIG. 1).

In additional aspects, the data management system 112 utilizes the data objects 206 to provide data to a client device 210. In particular, the data management system 112 receives one or more requests from the client device 210 via a data management software application 212. For example, the data management system 112 receives a request from the data management software application 212 of the client device 210 to provide information related to a particular group of data assets and data processing operations. The data management system 112 retrieves the relevant data objects (e.g., from the data objects 206) and provides the relevant data objects to the data management software application 212 for display and/or interaction at the client device 210.

Additionally, in some aspects, the reporting integration system 102 communicates with the client device 210 to generate a digital report for a dataset. Specifically, the reporting integration system 102 can determine a request (e.g., via the data management software application 212 at the client device 210) to generate a digital report for a particular dataset. In response to the request, the reporting integration system 102 can cause the client device 210 to execute a digital content editing application 214 and display information related to the request.

As used herein, the term "digital report" refers to a digital document including data describing other data. For example, a digital report includes a computer file including text data, image data, charts, or other data with metrics (e.g., statistics, tracked data, measurements) describing data points associated with operations of an entity. To illustrate, a digital report includes a text document with graphs, tables, charts, or other digital content with performance metrics, statistical measures, etc., related to various departments, data assets, or data processing operations of an entity. Furthermore, a "digital report template" refers to a non-finalized version of a digital report. Accordingly, a digital report template can include temporary (e.g., placeholder) data, incomplete portions, or unreviewed portions prior to generating a finalized digital report.

For example, the reporting integration system 102 retrieves the relevant data objects (e.g., from the data objects 206 at the server system 208) and generates a digital report template 216 including data from the relevant data objects. The reporting integration system 102 provides the digital report template 216 within the digital content editing application 214 at the client device 210 for viewing and/or further editing. Accordingly, the data management system 112 and the reporting integration system 102 utilize an integration of the data management software application 212 and the digital content editing application 214 to provide digital report generation and editing at the client device.

Figure 3:
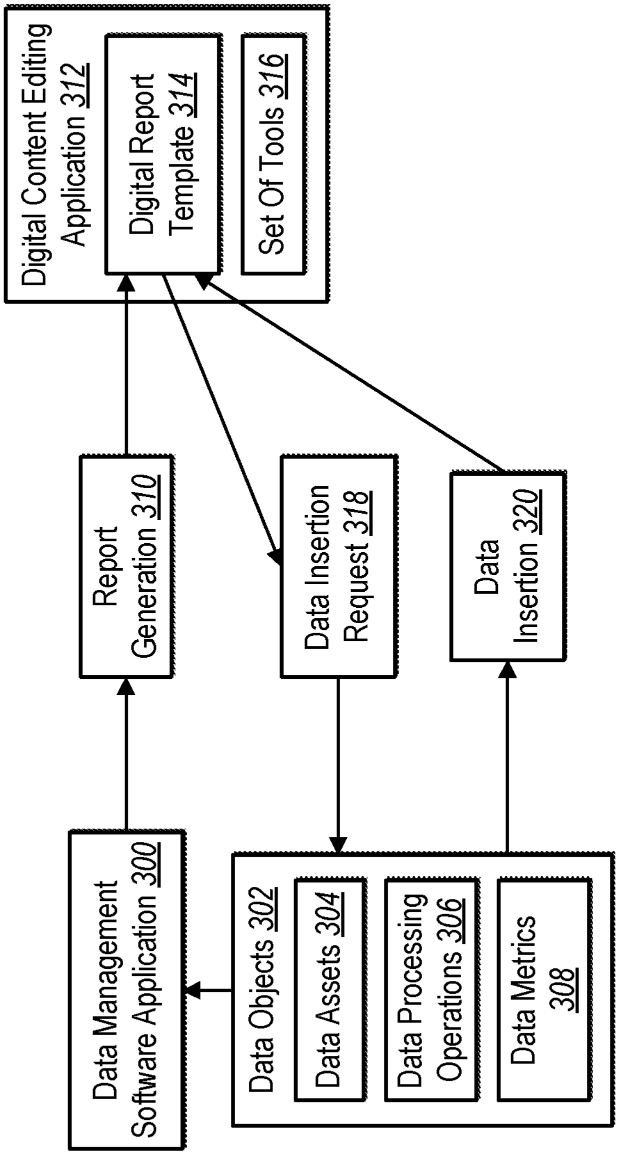
FIG. 3 illustrates an example of the reporting integration system generating and editing a digital report template via a plurality of software computing applications in accordance with some aspects.

FIG. 3 illustrates an example of the reporting integration system 102 utilizing an integration of data management tools and digital content editing tools to generate a digital report. Specifically, FIG. 3 illustrates that the reporting integration system 102 utilizes data objects representing data of an entity to generate a digital report including data from the data objects. Furthermore, the reporting integration system 102 can utilize an integration of software computing applications (e.g., a data management software application and a digital content editing application) to generate the digital report and provide the report for display and editing at a client device.

As illustrated in FIG. 3, the reporting integration system 102 utilizes a data management software application 300 to display information related to data extracted from digital data repositories. In particular, as mentioned, the data management software application 300 can provide tools for viewing and interacting with the data, such as by implementing control actions to install or modify controls for managing data. For example, the data management software application 300 includes tools to request to generate a digital report for data associated with operations of an entity. To illustrate, the request to generate the digital report can be executed via a user input to a graphical user interface element (e.g., a button or link) within the data management software application 300.

In some aspects, the reporting integration system 102 retrieves data objects 302 in response to the request. For example, the reporting integration system 102 retrieves data objects representing data assets 304, data processing operations 306, and/or data metrics 308. To illustrate, the data assets 304 can include hardware or software, the data processing operations 306 can include operations executed by the data assets 304, and the data metrics 308 can include values or datasets generated based on the data assets 304 and/or data processing operations 306. In additional examples, the reporting integration system 102 can retrieve other types of data objects, such as evidence objects linking other various data objects, data objects representing non-digital operations, or other data generated and/or stored for an entity.

In various aspects, the data objects 302 include attribute values representing details about the corresponding data. Specifically, the data objects 302 include object identifiers indicating the particular data, such as an object identifier mapping a particular data asset or data processing operation to a data object. Additionally, the data objects 302 can include attribute values representing the contents of files or other data, relationships to other data objects (e.g., object identifiers of the related data objects), relevant metadata, or other data.

Additionally, in response to the request to generate the digital report, the reporting integration system 102 performs a report generation 310 by causing a client device to launch a digital content editing application 312. For instance, the reporting integration system 102 executes code at the client device to launch the digital content editing application 312 in response to a button click within the data management software application 300. To illustrate, the reporting integration system 102 accesses a library (e.g., via an application programming interface) including code that causes the client device to launch the digital content editing application 312. Additionally, the report generation 310 operation results in the reporting integration system 102 generating a digital report template 314 including data from the data objects 302. Furthermore, the reporting integration system 102 provides the digital report template 314 for display within the digital content editing application 312 in response to launching the digital content editing application 312. In some aspects, the reporting integration system 102 causes the client device to launch a plurality of software computing applications in response to the report generation 310.

In some aspects, the reporting integration system 102 also provides a set of tools 316 for interacting with the digital report template 314. Specifically, the set of tools 316 can include tools to edit digital content including, but not limited to, tools to insert, move, remove, replace, or modify digital content. For example, the set of tools 316 can include tools to edit text, images, charts, tables, or other digital content within the digital report template 314. The set of tools 316 can also include tools to navigate, store, transmit, share, or otherwise interact with the digital report template 314.

According to some aspects, the reporting integration system 102 receives a data insertion request 318 to insert data into the digital report template 314. In particular, the reporting integration system 102 receives the data insertion request 318 in response to a user interaction with the digital report template 314 utilizing a tool from the set of tools 316. For instance, the digital content editing application 312 generates the data insertion request 318 in response to an interaction to insert text, a chart, or other data representing one or more data metrics corresponding to operations of the entity into the digital report template 314.

In response to the data insertion request 318, the reporting integration system 102 accesses the data objects 302 to obtain additional data relevant to the data insertion request 318. In some aspects, the reporting integration system 102 determines one or more additional data objects that include data relevant to the data insertion request 318. For example, the reporting integration system 102 can determine that the data insertion request 318 indicates a specific data type, a specific data metric, or a specific dataset to insert into the digital report template 314. The reporting integration system 102 thus identifies (e.g., via one or more object identifiers) the relevant data object(s), retrieves the relevant data object(s), and extracts the relevant data from the relevant data object(s) to insert into the digital report template. The reporting integration system 102 provides the data in a data insertion 320 to the digital content editing application 312 for modifying the digital report template 314.

In some aspects, the reporting integration system 102 causes the digital content editing application 312 to insert the data into the digital report template 314. For example, the reporting integration system 102 can insert data (e.g., attribute values such as data fields) from the data objects 302 and/or additional data objects into the digital report template 314 at a selected location. Alternatively, the reporting integration system 102 can insert the data into the digital report template 314 to replace selected content (e.g., a placeholder field or highlighted digital content) in the digital report template 314.

In additional aspects, the reporting integration system 102 utilizes the digital report template 314 to generate a final digital report. In particular, the reporting integration system 102 can provide a finalized digital report based on the digital report template 314 generated by the reporting integration system 102 and any edits made to the digital report template 314 in the digital content editing application 312. Additionally, the reporting integration system 102 can provide the finalized digital report for display at the client device, such as by providing the finalized report within the data management software application 300. In some aspects, the reporting integration system 102 generates a data object representing the finalized digital report and including the data (e.g., structure and content) of the finalized digital report.

FIGS. 4-10 illustrate graphical user interfaces corresponding to aspects of a data management software application and a digital content editing application. In particular, the graphical user interfaces provide tools for viewing and managing data associated with an entity and for generating and editing digital reports based on the data.

Figure 4:
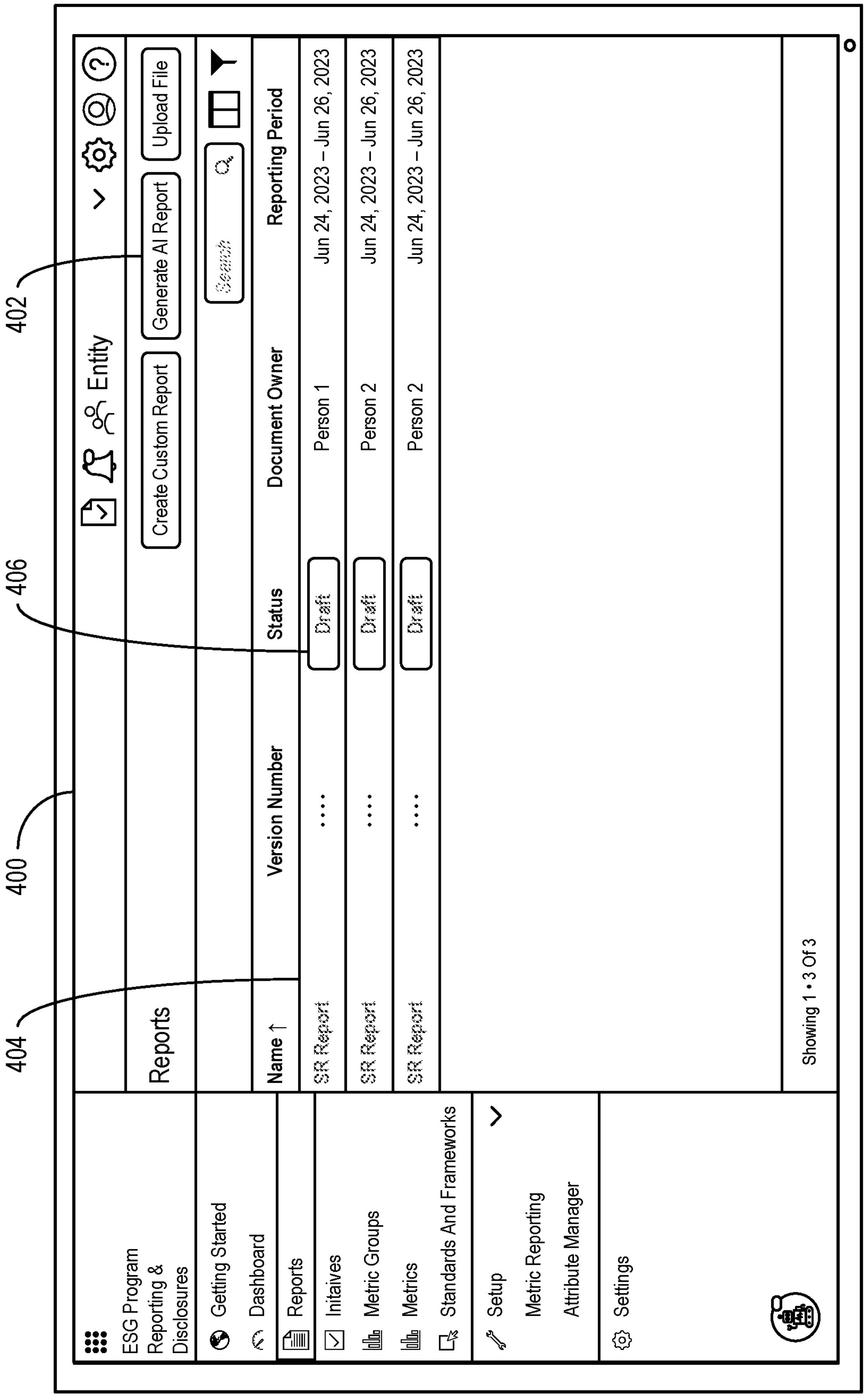
FIG. 4 illustrates an example of a graphical user interface for presenting data associated with an entity and initiating a request to generate a digital report in a data management software application in accordance with some aspects.

FIG. 4 illustrates an example of a graphical user interface of a data management software application 400 at a client device. In particular, FIG. 4 illustrates that the graphical user interface includes tools for viewing and managing data corresponding to operations of an entity. For example, the client device displays the graphical user interface of the data management software application 400 to include tools for creating and viewing previously created digital reports. To illustrate, the client device displays a report element 402 to generate a digital report. More specifically, the client device displays the report element 402 to use a machine-learning model (e.g., a generative neural network) to generate a digital report for a particular dataset.

In some aspects, in response to a selection of the report element 402, the reporting integration system 102 causes the client device to generate a digital report template for the particular dataset. For instance, a selection of the report element 402 causes the client device to display report generation options including an option to select one or more datasets, one or more data metrics, a report name, a reporting period, and/or other attributes for the digital report (e.g., a report category). As used herein, the term "report category" refers to a topic, operation, or component associated with an entity for generating a digital report. For example, a report category includes an indication of a regulatory framework associated with the digital report, a category of metric for the digital report, or other category for use in determining data to include in the digital report and/or for filtering or assigning the digital report. The client device can also display an option to select a particular machine-learning model for generating the digital report. In some aspects, the client device automatically selects a machine-learning model. As described in more detail below with respect to FIGS. 5-9, the reporting integration system 102 generates a digital report for display and editing at the client device.

In one or more aspects, the graphical user interface of the data management software application 400 also includes a list of previously generated digital reports. For example, as illustrated in FIG. 4, the client device displays a previously generated digital report 404 based on a particular dataset. Additionally, the client device also displays a status element 406 indicating a status of the previously generated digital report 404, which indicates whether the digital report is in progress (e.g., "Draft") or complete. The client device can also display additional information associated with the previously generated digital report 404 such as the report owner and a reporting period for the previously generated digital report 404. In some aspects, the client device displays one or more options for sharing, transmitting, or otherwise sending the digital report to one or more computing devices or systems.

As mentioned, in response to a selection of the report element 402, the reporting integration system 102 generates a digital report template. In particular, the reporting integration system 102 accesses a machine-learning model (e.g., a selected generative neural network) to generate the digital report template. For example, the reporting integration system 102 generates one or more prompts by accessing data from one or more data objects in a corresponding dataset and including the accessed data in the prompt(s). Specifically, the reporting integration system 102 determines and accesses data objects corresponding to the digital report template based on the attributes of the request, such as based on the report category and/or a dataset indicated in the request, to determine specific attribute values for generating the digital report template. The reporting integration system 102 provides the prompt(s) to the machine-learning model (e.g., to one or more server devices hosting the machine-learning model) to generate the digital report template.

In some aspects, the reporting integration system 102 causes the client device to switch from the data management software application 400 to a digital content editing application. Specifically, the reporting integration system 102 causes the client device to execute code to launch the digital content editing application in response to the selection of the report element 402 and change a display of the client device to present the digital content editing application. Furthermore, in connection with launching the digital content editing application, the reporting integration system 102 provides the generated digital report template for display within the digital content editing application at the client device.

Figure 5:
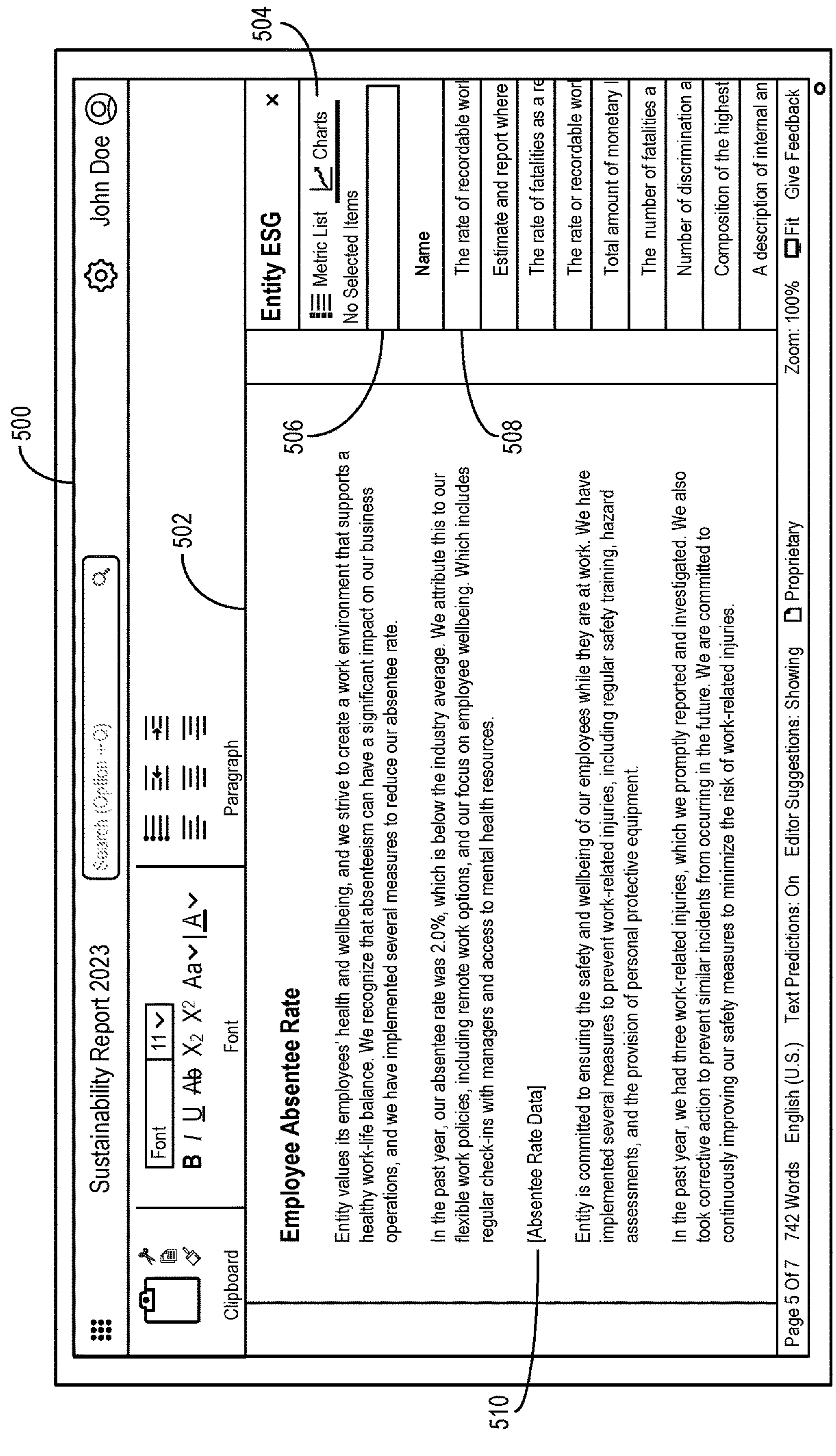
FIG. 5 illustrates an example of a graphical user interface for generating and presenting a digital report template in a digital content editing application in accordance with some aspects.

For example, FIG. 5 illustrates an example of a graphical user interface of a digital content editing application 500 at a client device. In particular, the client device displays a digital report template 502 within the graphical user interface of the digital content editing application 500. For example, the reporting integration system 102 generates the digital report template 502 in response to a selection of an option to generate a digital report via a data management software application. Accordingly, the client device launches the digital content editing application 500 and displays the digital report template 502 within the digital content editing application 500 in response to the selection of the option to generate the digital report.

In some aspects, the reporting integration system 102 also causes the digital content editing application 500 at the client device to open a panel including a set of tools for interacting with the digital report template 502. For instance, in response to launching the digital content editing application 500 at the client device, the reporting integration system 102 causes the digital content editing application 500 to open the panel and display tools for editing the digital report template 502. As used herein, the term "panel" refers to a separate portion of a graphical user interface or software computing application specifically reserved for integration of a digital content editing application with a data management software application. For instance, the panel can include a side portion of a graphical user interface, an overlay, or a separate window.

The panel can also include data related to the digital report template 502 (e.g., according to data objects of a dataset corresponding to the digital report template 502). Thus, in response to a single selection of the report element 402 of FIG. 4, the reporting integration system 102 can cause the client device to launch the digital content editing application 500 and display the digital report template 502 and the panel with the set of tools and related data within the digital content editing application 500. To illustrate, the reporting integration system 102 causes the digital content editing application 500 to open a software add-in/extension panel corresponding to the data management software application. As used herein, the term "software add-in" refers to code that causes a software computing application to access data outside the software computing application. For example, a software add-in causes an application to access another application or system to incorporate operations and/or data from the other application or system into the application in which the software add-in is installed.

According to some aspects, the reporting integration system 102 provides tools to insert additional digital content into the digital report template 502. Specifically, the reporting integration system 102 provides one or more options to select a data type for digital content to insert into the digital report template 502. For example, the reporting integration system 102 includes a chart option 504 to select a chart data type to insert into the digital report template 502.

Figure 8:
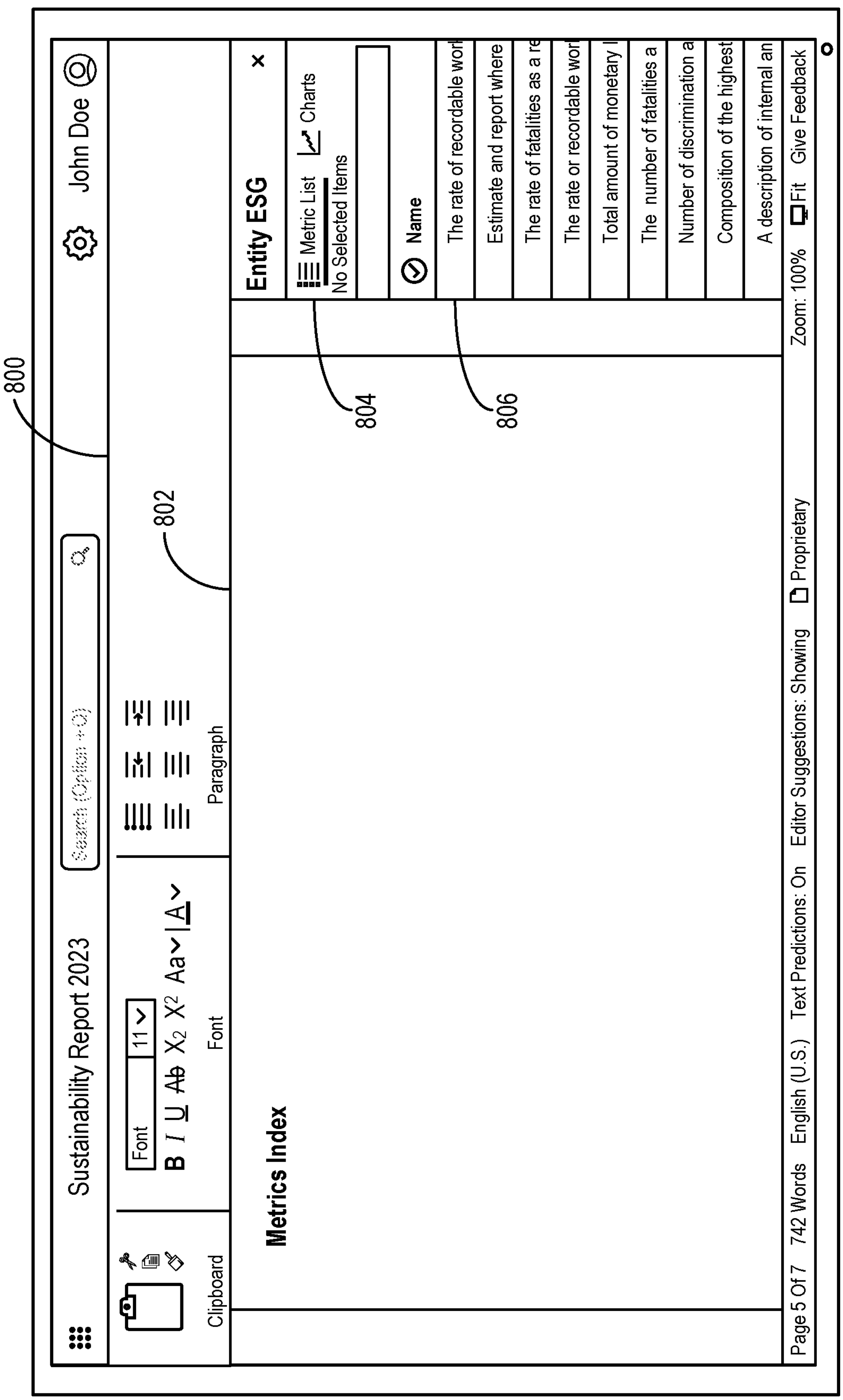
FIG. 8 illustrates an example of a graphical user interface for searching for data associated with a data management software application in a panel of a digital content editing application in accordance with some aspects.

Furthermore, the reporting integration system 102 can provide a search option 506 to search data related to the digital report template 502. In particular, the reporting integration system 102 links the search option 506 to data associated with the data management software application. For example, the reporting integration system 102 links the search option 506 to data objects generated and managed by the data management system 112. Additionally, the client device can also display a set of default options (e.g., a first default option 508) in the panel of the digital content editing application 500 along with the search option 506. FIG. 8 and the corresponding description provide additional detail regarding the set of default options.

In some aspects, generating the digital report template 502 can involve the reporting integration system 102 generating placeholder content 510 in the digital report template 502. Specifically, the reporting integration system 102 can generate the placeholder content 510 including placeholder text, placeholder charts, placeholder images, etc. The placeholder content 510 can include simple text characters, modifiable objects, or other digital content to allow for various methods of replacing the placeholder content 510 with new content. In some aspects, the reporting integration system 102 determines the data type of the placeholder content 510 based on a data type of a portion of the digital report template 502 at a location in which the reporting integration system 102 inserts the placeholder content 510.

Figure 6:
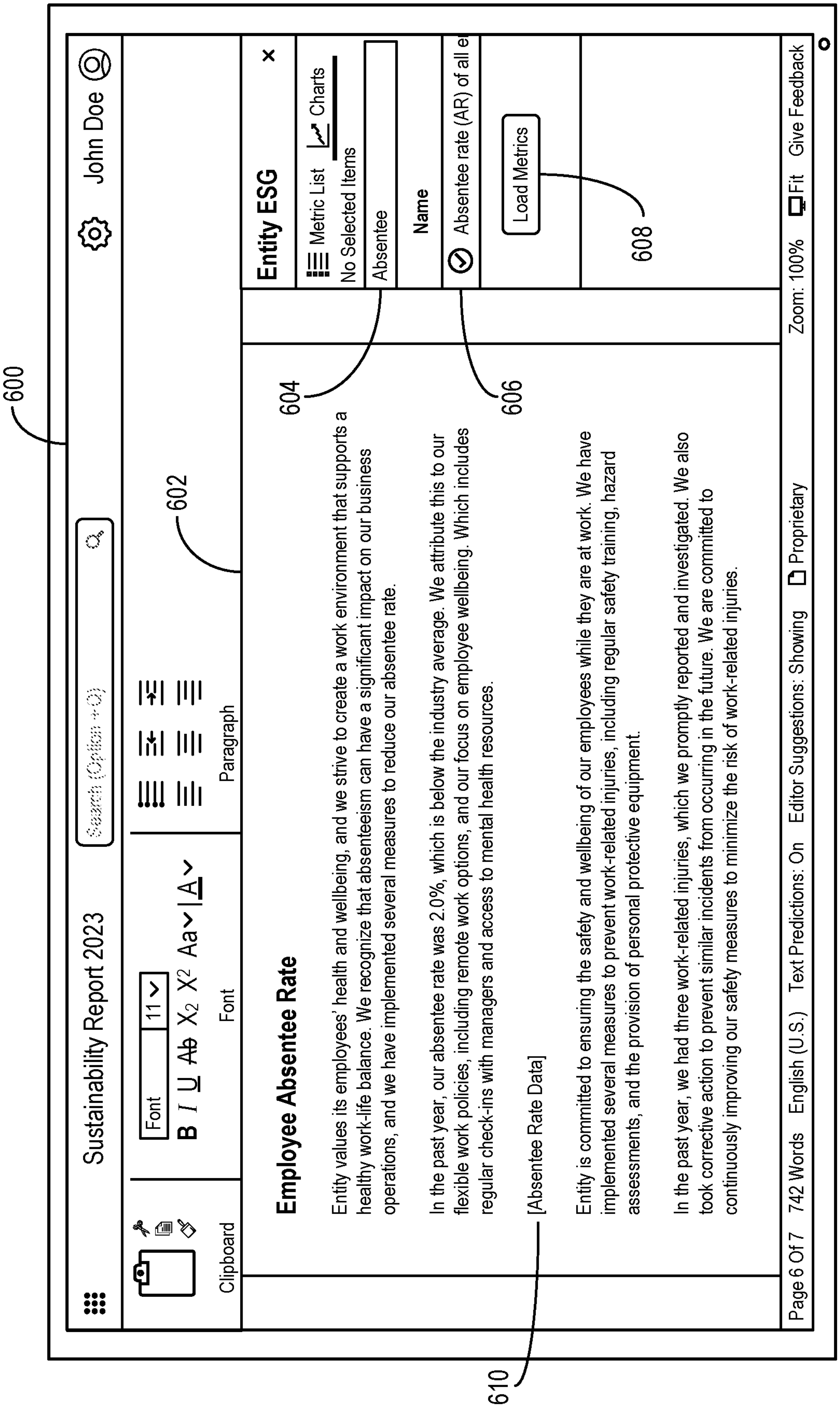
FIG. 6 illustrates an example of a graphical user interface for editing a digital report template utilizing one or more tools in a panel of a digital content editing application in accordance with some aspects.

FIG. 6 illustrates an example of the reporting integration system 102 generating results for a search query in a panel of a digital content editing application 600. In particular, as illustrated in FIG. 6, the reporting integration system 102 presents a digital report template 602 in a graphical user interface of the digital content editing application 600 with a panel of tools and data related to the digital report template 602 (e.g., in connection with a data management software application). As mentioned, the panel can include a search option 604 to search for data related to an entity by using a plurality of data objects.

In response to a search entered into the search option 604, the reporting integration system 102 accesses data objects corresponding to the terms in the search query and presents, within the panel of the digital content editing application 600, a plurality of results. To illustrate, the reporting integration system 102 determines one or more additional data objects including attribute values corresponding to one or more terms in the search query. For example, the reporting integration system 102 can identify data objects based on object identifiers, metrics identified in connection with the data objects, linked data objects, or content of computing files represented by the data objects based on terms in the search query.

In some aspects, in response to identifying relevant data objects for a search query for a selected data type (e.g., a chart), the reporting integration system 102 accesses the relevant data objects and extracts data from the data objects. Additionally, the reporting integration system 102 can generate results of the search query to include in the panel corresponding to the extracted data. For example, the reporting integration system 102 can include a first search result 606 corresponding to a selected metric. To illustrate, the reporting integration system 102 can display the first search result 606 in response to a load metrics option 608. As illustrated in more detail with respect to FIG. 7, the reporting integration system 102 can insert data based on a search in the panel to replace placeholder content 610 in the digital report template 602.

Figure 7:
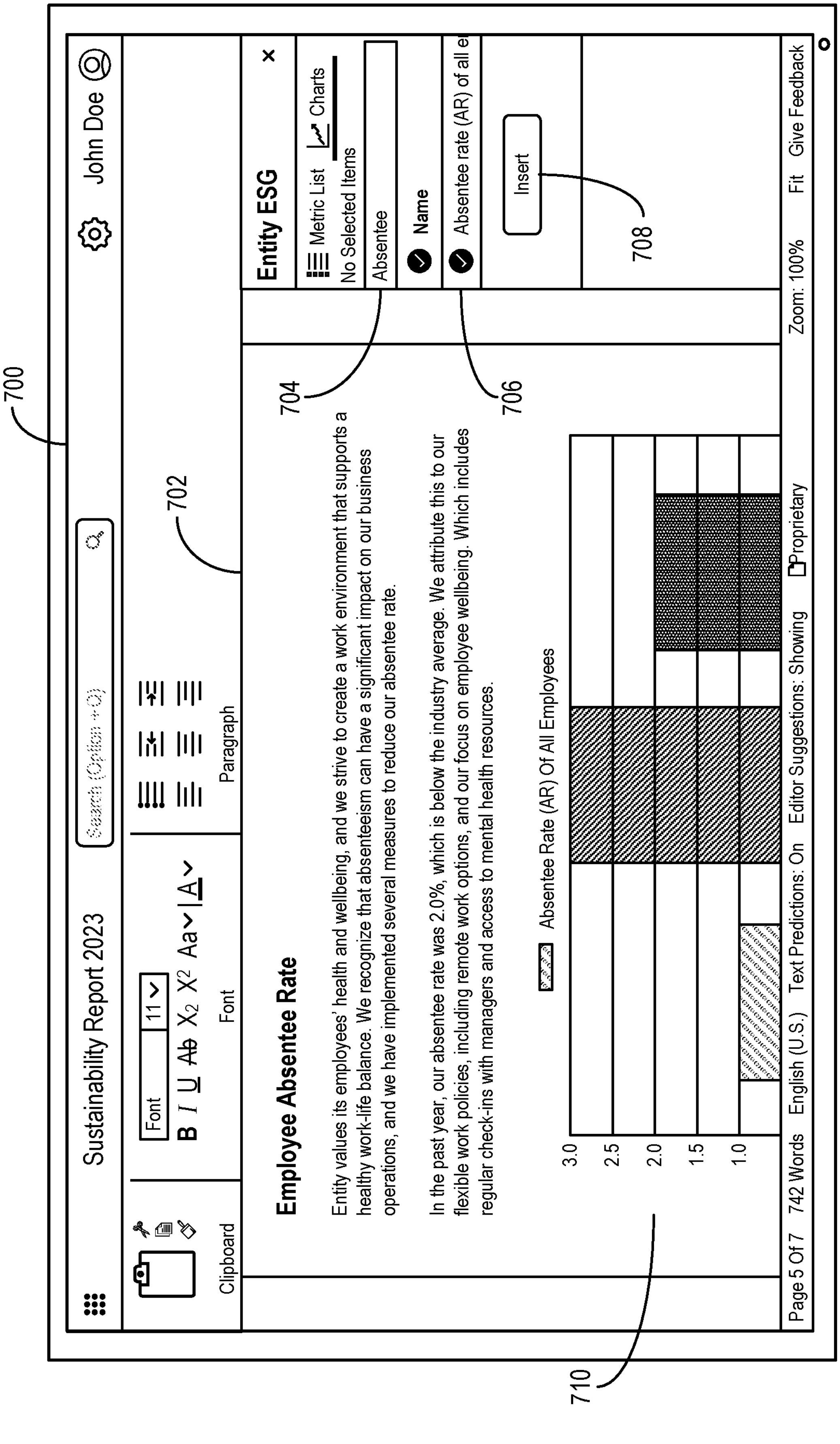
FIG. 7 illustrates an example of a graphical user interface for inserting data into a digital report template utilizing one or more tools in a panel of a digital content editing application in accordance with some aspects.

FIG. 7 illustrates an example of the reporting integration system 102 editing a digital report template within a digital content editing application 700. Specifically, a client device displays a graphical user interface of the digital content editing application 700 including a digital report template 702. Additionally, FIG. 7 illustrates that the client device displays a search query 704 and a search result 706 for the search query 704 in the panel of tools displayed with the digital report template 702.

In some aspects, in response to a selection of the search result 706 in the panel, the reporting integration system 102 causes the digital content editing application 700 to display an insert option 708 to insert data corresponding to the search result 706 into the digital report template 702. In particular, the reporting integration system 102 can use the extracted data from the relevant data objects to insert digital content into the digital report template 702. The reporting integration system 102 can cause the digital content editing application 700 to insert the digital content corresponding to the selected result into the digital report template 702 by replacing the placeholder content with the extracted data. Alternatively, the reporting integration system 102 causes the digital content editing application 700 to insert the digital content into a selected location in the digital report template 702.

To illustrate, the reporting integration system 102 can replace the placeholder content with new content in response to separate inputs to delete the placeholder content and to insert the new content. Alternatively, the reporting integration system 102 can replace the placeholder content with new content in response to an input to replace the placeholder content with a selected item from the panel. For example, the reporting integration system 102 can detect an interaction with a modifiable object of the placeholder content and the search result 706 in the panel and insert the new content into the digital report template 702 at a location of the placeholder content.

In some aspects, as mentioned, the reporting integration system 102 provides options to insert digital content of various data types into digital report templates. For example, the reporting integration system 102 determines a selected data type or format from the set of tools in the panel (e.g., a graph, a table, text, images). In response to a selection of the insert option 708, the reporting integration system 102 retrieves and/or formats the data from the data objects according to the data type. To illustrate, in response to determining that the selected data type is a chart, the reporting integration system 102 can obtain the data from the data objects and generate a chart 710 including the data (e.g., by utilizing chart generation operations of the digital content editing application 700). Additionally, the reporting integration system 102 can insert the chart 710 into the digital report template 702 at a location of the placeholder content and/or at a selected location of the digital report template 702.

In alternative aspects, the reporting integration system 102 utilizes digital content generation operations at one or more separate devices to generate digital content to insert into the digital report template 702. For instance, the reporting integration system 102 (or the data management system 112) can generate the chart 710 (e.g., an image including the chart) at one or more server devices. The server device(s) can provide the chart 710 to the client device in response to a request to insert the chart 710 into the digital report template 702, and the client device can insert the chart 710 into the digital report template 702.

FIG. 8 illustrates an additional example of a client device editing a digital report template in a digital content editing application. In particular, as illustrated, the client device displays a graphical user interface of a digital content editing application 800 to present a digital report template 802. In one or more aspects, the reporting integration system 102 causes the digital content editing application 800 to display tools including a metric option 804 to insert text data related to one or more selected metrics. For example, in response to a selection of the metric option 804, the reporting integration system 102 provides a set of available metrics 806 to provide for display at the client device (e.g., in the panel).

In some aspects, the set of available metrics 806 include metrics determined via the data management software application. Specifically, the reporting integration system 102 (or the data management system 112) generates the metrics in response to interactions with the data management software application for one or more datasets. Accordingly, the reporting integration system 102 obtains the set of available metrics 806 for display in the panel of the digital content editing application 800 based on the integration between the digital content editing application 800 and the data management software application.

Figure 9:
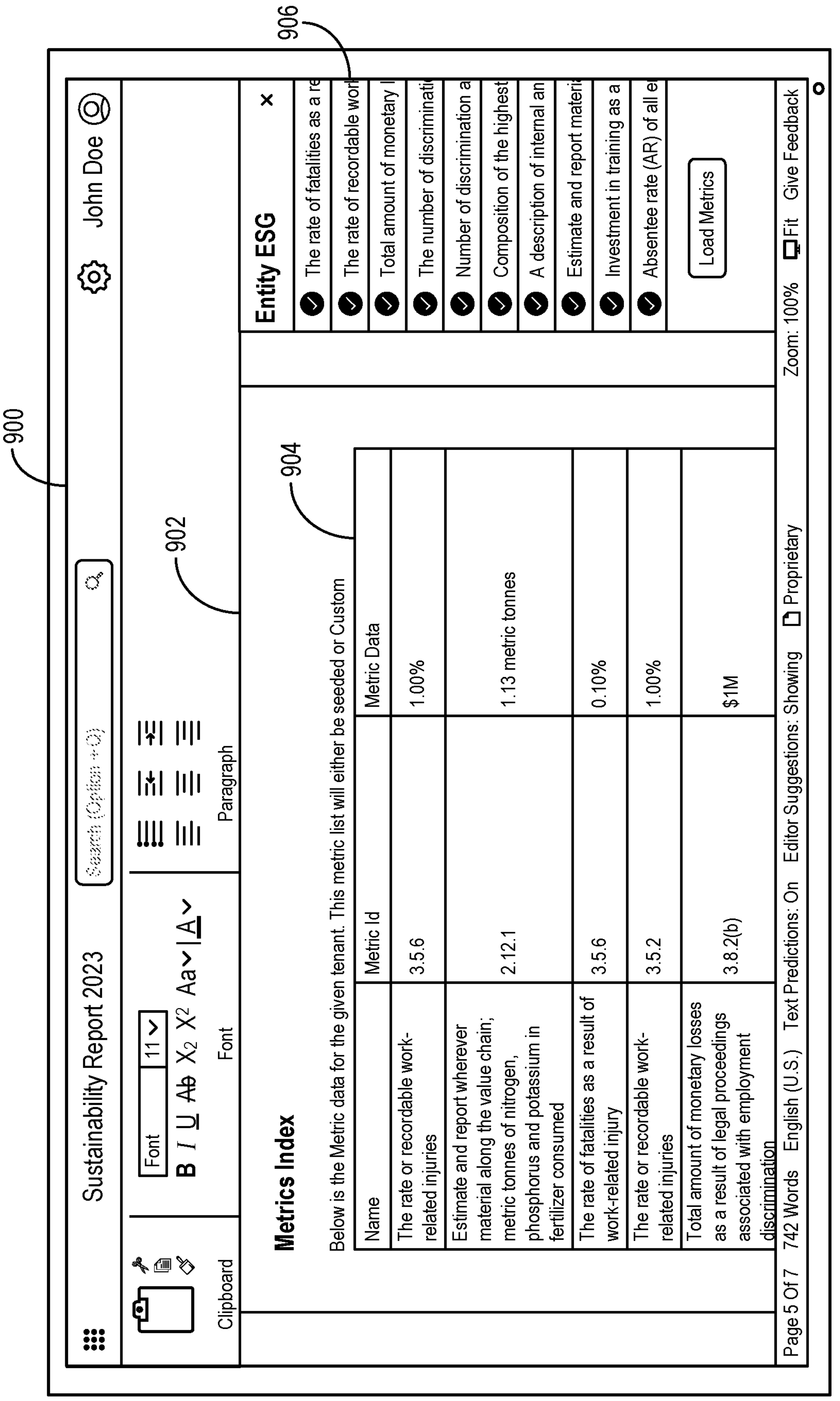
FIG. 9 illustrates an example of a graphical user interface for inserting data into a digital report template utilizing one or more tools in a panel of a digital content editing application in accordance with some aspects.

FIG. 9 illustrates an example of a graphical user interface of a digital content editing application 900 presenting a digital report template 902. In particular, as described above with respect to FIG. 8, the reporting integration system 102 can obtain data related to one or more metrics to insert into the digital report template 902. For example, the reporting integration system 102 can insert a table 904 including metrics selected from the panel into the digital report template 902 at an indicated location. To illustrate, the reporting integration system 102 can extract attributes from the corresponding data objects (e.g., metric objects) and insert the extracted data into cells of the table 904.

Additionally, in various aspects, the reporting integration system 102 provides tools to select one or more metrics from the panel in the digital content editing application 900. For example, as illustrated in FIG. 9, the reporting integration system 102 can determine that a plurality of metrics 906 are selected. To illustrate, the plurality of metrics 906 can include all metrics displayed in the panel (e.g., in response to a selection of all metrics). Alternatively, the reporting integration system 102 can determine that a single metric is selected or a subset of available metrics are selected and obtain the data from the corresponding data objects to insert into the digital report template 902.

Figure 10:
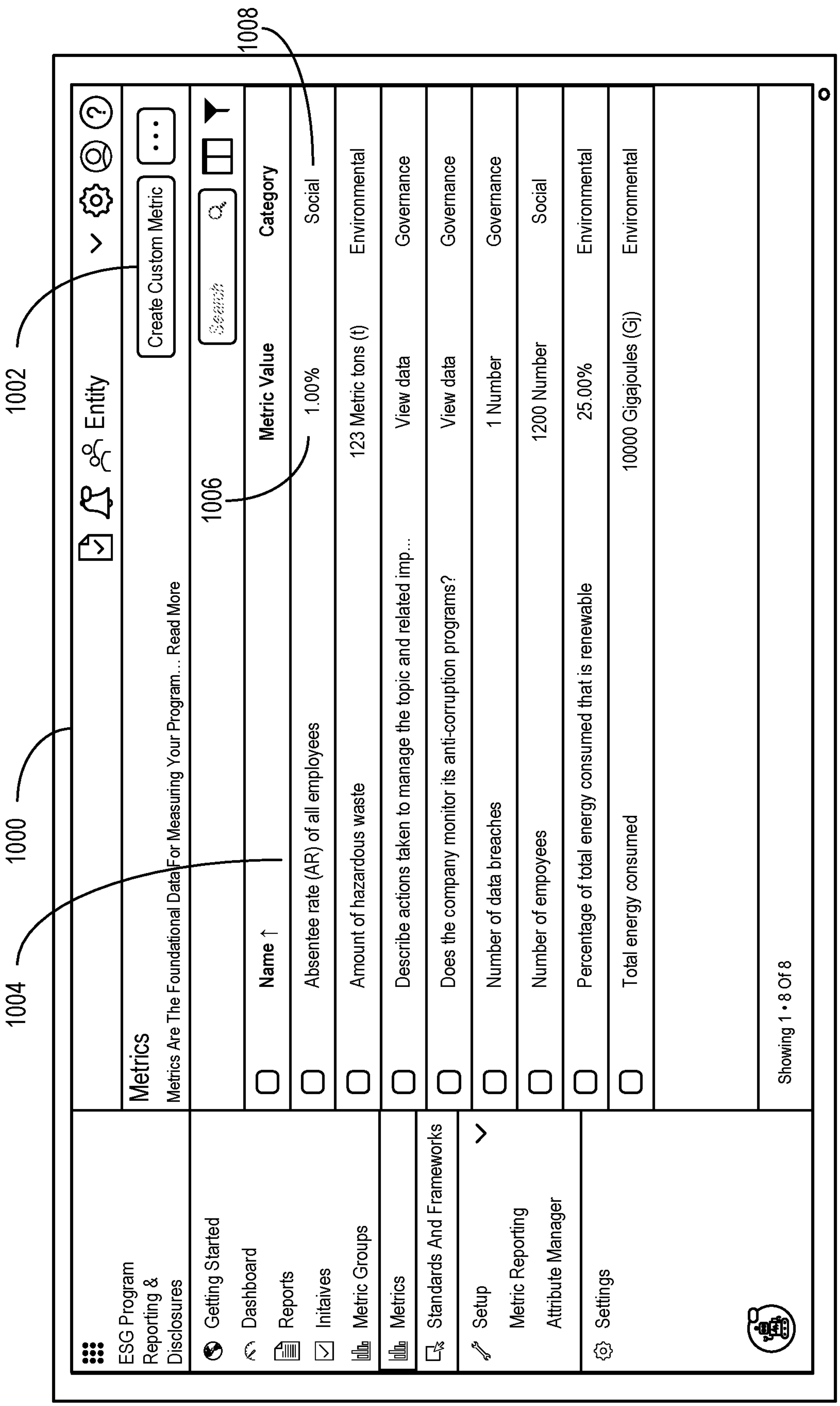
FIG. 10 illustrates an example of a graphical user interface for generating metrics associated with data associated with an entity for creating digital reports in accordance with some aspects.

As mentioned, the reporting integration system 102 can determine a variety of metrics related to data managed for an entity. FIG. 10 illustrates an example of a client device displaying a graphical user interface of a data management software application 1000 for managing data of an entity. In connection with generating digital reports and/or editing digital report templates, the reporting integration system 102 (or the data management system 112) provides tools within the data management software application 1000 for generating or otherwise selecting metrics for the data of the entity.

As illustrated in FIG. 10, the client device displays a create metric option 1002 within the data management software application 1000. In particular, in response to a selection of the create metric option 1002, the client device can display one or more options for generating a metric for one or more datasets. For example, the client device can display options to select the one or more datasets. Additionally, the client device can display options to select or otherwise indicate an algorithm or operation for generating the metric, such as in response to selection of a report category. Accordingly, in response to determining the attributes of the metric based on the information input to the data management software application 1000, the reporting integration system 102 (or the data management system 112) generates a custom metric according to the indicated attributes.

FIG. 10 also illustrates that the client device displays a list 1004 of metrics established for an entity. In particular, the list 1004 includes a plurality of metrics corresponding to different types of data managed for the entity. For example, the metrics are determined utilizing various algorithms and for certain datasets depending on the entity and its data. To illustrate, the list 1004 can include metrics such as employee absentee rates, number of data breaches, number of employees, energy consumed, or other metrics related to an ESG program. Alternatively, the list 1004 includes other metrics related to one or more other standards or frameworks to assist in determining compliance of the entity with the standards or frameworks. The list 1004 can also include a metric value 1006 and/or a category 1008 for each indicated metric in the list 1004.

In various aspects, adding metrics to the list 1004 causes the reporting integration system 102 to add the corresponding metrics to a panel in a digital content editing application in connection with editing a digital report. In some aspects, in response to generate a digital report, the reporting integration system 102 obtains the most recent list of metrics (including the added metrics) and causes the digital content editing application to display the metrics in a panel with tools and data related to a digital report template. Furthermore, in response to a request to search for one or more metrics within the digital content editing application, the reporting integration system 102 performs the search query on the most recent list of metrics and causes the digital content editing application to display the results in the panel. Accordingly, because the software computing applications are integrated, the reporting integration system 102 can provide up-to-date information related to editing a digital report template, including data generated in the data management software application 1000 while editing a digital report template in the digital content editing application (e.g., based on a user switching back and forth between the applications).

Figure 11:
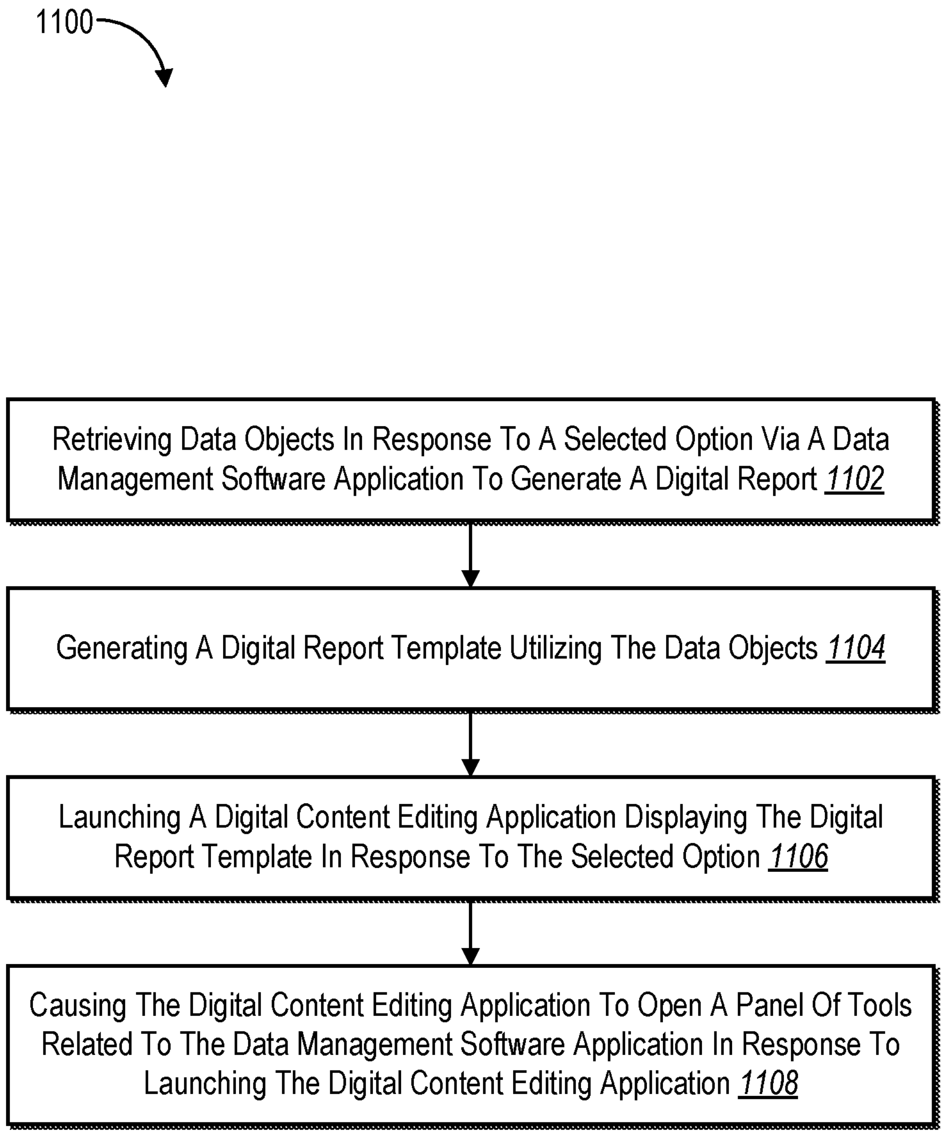
FIG. 11 illustrates an example flowchart of a process for integrating data extraction software with a plurality of software computing applications for managing data of an entity and generating digital reports in accordance with some aspects.

Turning now to FIG. 11, this figure shows a flowchart of a process 1100 of integrating a data management software application and a digital content editing application with data extraction software to generate digital reports. While FIG. 11 illustrates acts according to one embodiment, alternative aspects may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further aspects, a system (e.g., one or more system described in FIGS. 1 and 12) can perform the acts of FIG. 11.

As shown, the process 1100 includes an act 1102 of retrieving data objects in response to a selected option via a data management software application to generate a digital report. For example, act 1102 involves, in response to a selection of an option via a data management software application to generate a digital report for a dataset associated with an entity, retrieving data objects comprising data extracted from one or more digital data repositories via a data extraction software application. In some aspects, act 1102 is implemented using one or more examples described above with respect to FIGS. 2-4.

The process 1100 also includes an act 1104 of generating a digital report template utilizing the data objects. For example, act 1104 involves generating, utilizing the data objects, a digital report template comprising the data extracted from the one or more digital data repositories. In some aspects, act 1104 is implemented using one or more examples described above with respect to FIGS. 2-5.

Additionally, the process 1100 includes an act 1106 of launching a digital content editing application displaying the digital report template in response to the selected option. For example, act 1106 involves launching, in response to the selection of the option, a digital content editing application displaying the digital report template. In some aspects, act 1106 is implemented using one or more examples described above with respect to FIGS. 2-3, and 5.

The process 1100 further includes an act 1108 of causing the digital content editing application to open a panel of tools related to the data management software application in response to launching the digital content editing application. For example, act 1108 involves, in response to launching the digital content editing application, causing the digital content editing application to open a panel comprising a set of tools corresponding to the data management software application with data related to the digital report template. In some aspects, act 1108 is implemented using one or more examples described above with respect to FIGS. 2-3, and 5-9.

In various aspects, act 1102 involves detecting the selection of the option to generate the digital report within the data management software application in connection with a regulator framework. Act 1102 can also involve determining the data objects representing one or more data objects or one or more data processing operations associated with the regulatory framework based on the data extracted from the one or more digital data repositories via the data extraction software application.

Act 1104 can involve, in response to the selection of the option, determining a report category associated with the digital report. Act 1104 can involve selecting the data objects and attribute values of the data objects based on the report category. Act 1104 can also involve generating the digital report template by inserting the attribute values of the data objects into a digital document.

Act 1106 can further involve executing code to cause a computing device to launch the digital content editing application in response to the selection of the option. Act 1106 can also involve presenting the digital report template within the digital content editing application in response to launching the digital content editing application.

Additionally, act 1108 can involve executing code from a software add-in installed with the digital content editing application to cause a computing device to select the set of tools corresponding to the data management software application. Act 1108 can involve causing, via the software add-in, the digital content editing application to display the set of tools corresponding to the data management software application within the panel.

Act 1108 can further involve causing the digital content editing application to open the panel comprises providing an insertion tool within the panel to insert additional data into the digital report template. The process 1100 can further include, in response to a selection of the insertion tool within the panel, causing the digital content editing application to: extract the additional data from one or more additional data objects associated with the entity; and insert the additional data into the digital report template at a selected location.

In some aspects, act 1108 can involve causing the digital content editing application to communicate with the data management software application or a database associated with the data management software application to retrieve the one or more additional data objects.

Act 1108 can further involve determining a selected format for inserting the additional data into the digital report template in connection with the selection of the insertion tool. Act 1108 can also involve inserting the additional data into the digital report template in the selected format.

Act 1108 can involve determining an object identifier corresponding to a selected data element in the panel. Act 1108 can involve extracting the additional data from the one or more additional data objects by determining the one or more additional data objects and an attribute value corresponding to the additional data utilizing the object identifier.

In one or more aspects, the process 1100 includes an act for providing, for display within a graphical user interface of a data management software application, an option to generate a digital report for the data of the one or more digital data repositories. In some aspects, the act is implemented using one or more examples described above with respect to FIGS. 4-5. The process 1100 can also include an act for, in response to a selection of the option to generate a digital report for a dataset comprising the data of the one or more digital data repositories via the graphical user interface of the data management software application. In some aspects, the act is implemented using one or more examples described above with respect to FIGS. 2-3 and 5-9. Specifically, the process 1100 can include generating a digital report template by accessing data objects generated for the data via a data extraction software application. The process 1100 can include providing the digital report template for display within a digital content editing application. Additionally, the process 1100 can include, in connection with providing the digital report template for display within the digital content editing application, cause the digital content editing application to open a panel comprising a set of tools corresponding to the data management software application with data related to the digital report template. In some aspects, the acts above are implemented using one or more examples described with respect to FIGS. 2-5.

In some aspects, the process 1100 includes determining the data objects corresponding to the digital report based on one or more inputs indicating a report category for the digital report and a dataset associated with the one or more data assets or the one or more data processing operations. The process 1100 can include accessing the data objects to determine attribute values corresponding to the report category and the dataset.

The process 1100 can include executing code to launch the digital content editing application from within the data management software application. The process 1100 can also include causing the digital content editing application to display the digital report template.

The process 1100 can also include determining that a portion of the digital report template corresponds to a particular data type. The process 1100 can further include inserting placeholder content of the particular data type into the digital report template at a location of the portion of the digital report template.

The process 1100 can include determining, via the set of tools of the panel in the digital content editing application, a request to insert additional data of the particular data type into the digital report template. The process 1100 can also include causing the digital content editing application to replace the placeholder content with the additional data in the digital report template.

The process 1100 can include accessing, in response to the request comprising a search query via the panel, an additional data object comprising an attribute value corresponding to one or more terms in the search query. The process 1100 can further include causing the digital content editing application to replace the placeholder content with the additional data by: extracting the additional data from the additional data object, and causing the digital content editing application to insert the additional data from the additional data object into the digital report template in place of the placeholder content.

Additionally, the process 1100 can include retrieving, in response to a request to insert additional data into a chart in the digital report template via the set of tools in the panel of the digital content editing application, an additional data object comprising the additional data. The process 1100 can include generating the chart comprising the additional data from the additional data object. The process 1100 can further include causing the digital content editing application to insert the chart into the digital report template.

The process 1100 can also include an act for determining, via a data management software application, a selection of an option to generate a digital report for a dataset representing one or more operations associated with an entity. In some aspects, the act is implemented using one or more examples described above with respect to FIGS. 2-4. The process 1100 can further include an act for retrieving, in connection with the dataset, data objects representing data extracted from one or more digital data repositories of the entity via a data extraction software application. In some aspects, the act is implemented using one or more examples described above with respect to FIGS. 2-4. The process 1100 can also include an act for generating, utilizing the data objects, a digital report template comprising the data extracted from the one or more digital data repositories of the entity. In some aspects, the act is implemented using one or more examples described above with respect to FIGS. 2-5. Furthermore, the process 1100 can include an act for, in response to the selection of the option: launching a digital content editing application presenting the digital report template; and causing the digital content editing application to present a set of tools corresponding to the data management software application with data related to the digital report template. In some aspects, the act is implemented using one or more examples described above with respect to FIGS. 2-5.

In some aspects, the process 1100 includes providing, for display within a web browser at a client device, the data management software application including the option to generate the digital report. The process 1100 can include, in response to the selection of the option, executing code to cause the client device to navigate from the data management software application in the web browser to the digital content editing application presenting the digital report template with a panel comprising the set of tools corresponding to the data management software application.

The process 1100 can include determining, in response to a request to insert additional data into the digital report template via the set of tools, one or more additional data objects representing additional data extracted from the one or more digital data repositories. The process 1100 can further include causing the digital content editing application to insert the additional data into the digital report template.

The process 1100 can also include determining, in response to the request comprising a search query including one or more terms, the one or more additional data objects by matching the one or more terms of the search query to one or more object identifiers corresponding to the one or more additional data objects. The process 1100 can further include, in response to the search query, causing the digital content editing application to display an indicator representing the additional data corresponding to the one or more additional data objects.

Aspects described in the present disclosure may comprise or utilize a special purpose or general-purpose computer including computer hardware, such as, for example, one or more processors and system memory, as discussed in greater detail below. Aspects within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, aspects of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices.

When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some aspects, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Aspects of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
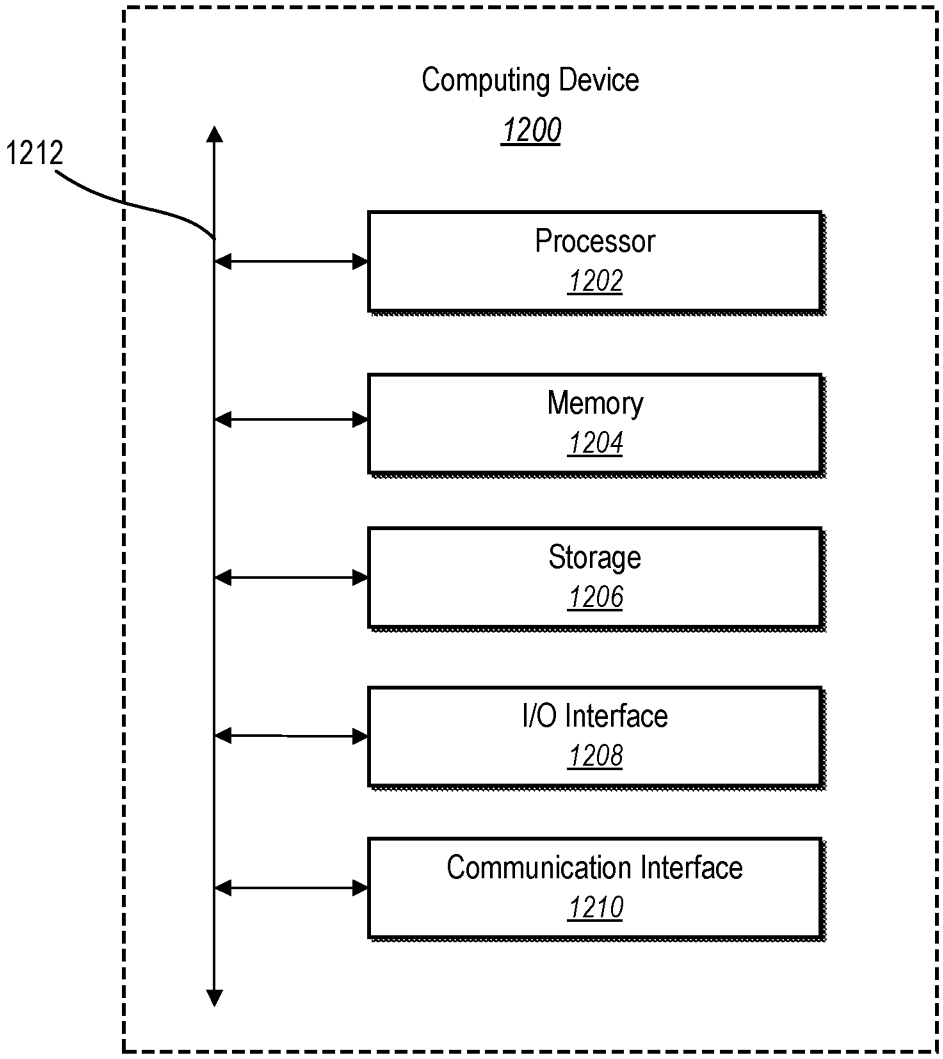
FIG. 12 illustrates an example of a computing device in accordance with some aspects.

FIG. 12 illustrates a block diagram of exemplary computing device 1200 that may be configured to perform one or more of the processes described above. One will appreciate that one or more computing devices such as the computing device 1200 may implement the system(s) of FIG. 1. As shown by FIG. 12, the computing device 1200 can comprise a processor 1202, a memory 1204, a storage device 1206, an I/O interface 1208, and a communication interface 1210, which may be communicatively coupled by way of a communication infrastructure 1212. In certain aspects, the computing device 1200 can include fewer or more components than those shown in FIG. 12. Components of the computing device 1200 shown in FIG. 12 will now be described in additional detail.

In some aspects, the processor 1202 includes hardware for executing instructions, such as those making up a computer program. As an example, and not by way of limitation, to execute instructions for dynamically modifying workflows, the processor 1202 may retrieve (or fetch) the instructions from an internal register, an internal cache, the memory 1204, or the storage device 1206 and decode and execute them. The memory 1204 may be a volatile or non-volatile memory used for storing data, metadata, and programs for execution by the processor(s). The storage device 1206 includes storage, such as a hard disk, flash disk drive, or other digital storage device, for storing data or instructions for performing the methods described herein.

The I/O interface 1208 allows a user to provide input to, receive output from, and otherwise transfer data to and receive data from computing device 1200. The I/O interface 1208 may include a mouse, a keypad or a keyboard, a touch screen, a camera, an optical scanner, network interface, modem, other known I/O devices or a combination of such I/O interfaces. The I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain aspects, the I/O interface 1208 is configured to provide graphical data to a display for presentation to a user. The graphical data may be representative of one or more graphical user interfaces and/or any other graphical content as may serve a particular implementation.

The communication interface 1210 can include hardware, software, or both. In any event, the communication interface 1210 can provide one or more interfaces for communication (such as, for example, packet-based communication) between the computing device 1200 and one or more other computing devices or networks. As an example, and not by way of limitation, the communication interface 1210 may include a network interface controller (NIC) or network adapter for communicating with an Ethernet or other wirebased network or a wireless NIC (WNIC) or wireless adapter for communicating with a wireless network, such as a WI-FI.

Additionally, the communication interface 1210 may facilitate communications with various types of wired or wireless networks. The communication interface 1210 may also facilitate communications using various communication protocols. The communication infrastructure 1212 may also include hardware, software, or both that couples components of the computing device 1200 to each other. For example, the communication interface 1210 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary aspects thereof. Various aspects and aspects of the present disclosure(s) are described with reference to details discussed herein, and the accompanying drawings illustrate the various aspects. The description above and drawings are illustrative of the disclosure and are not to be construed as limiting the disclosure. Numerous specific details are described to provide a thorough understanding of various aspects of the present disclosure.

The present disclosure may be embodied in other specific forms without departing from its spirit or essential characteristics. The described aspects are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:

in response to a selection of an option via a data management software application to generate a digital report for a dataset associated with an entity, retrieving, by a hardware processor, data objects comprising data extracted from one or more digital data repositories via a data extraction software application;

generating, by the hardware processor utilizing the data objects, a digital report template comprising the data extracted from the one or more digital data repositories, wherein generating the digital report template comprises:

determining that a portion of the digital report template corresponds to a particular data type; and inserting placeholder content into the digital report template at a location of the portion of the digital report template;

launching, by the hardware processor in response to the selection of the option, a digital content editing application displaying the digital report template; and in response to launching the digital content editing application, causing, by the hardware processor, the digital content editing application to open a panel comprising a set of tools corresponding to the data management software application with data related to the digital report template.

2. The computer-implemented method of claim 1, wherein retrieving the data objects comprises:

detecting the selection of the option to generate the digital report within the data management software application in connection with a regulatory framework; and determining the data objects based on the data extracted from the one or more digital data repositories via the data extraction software application.

3. The computer-implemented method of claim 1, wherein generating the digital report template comprises:

in response to the selection of the option, determining a report category associated with the digital report;

selecting the data objects and attribute values of the data objects based on the report category; and generating the digital report template by inserting the attribute values of the data objects into a digital document.

4. The computer-implemented method of claim 1, wherein launching the digital content editing application comprises:

executing code to cause a computing device to launch the digital content editing application in response to the selection of the option; and presenting the digital report template within the digital content editing application in response to launching the digital content editing application.

5. The computer-implemented method of claim 1, wherein causing the digital content editing application to open the panel comprises:

executing code from a software add-in installed with the digital content editing application to cause a computing device to select the set of tools corresponding to the data management software application; and causing, via the software add-in, the digital content editing application to display the set of tools corresponding to the data management software application within the panel.

6. The computer-implemented method of claim 1, wherein:

causing the digital content editing application to open the panel comprises providing an insertion tool within the panel to insert additional data into the digital report template; and in response to a selection of the insertion tool within the panel, causing the digital content editing application to:

extract the additional data from one or more additional data objects associated with the entity; and insert the additional data into the digital report template at a selected location.

7. The computer-implemented method of claim 6, wherein causing the digital content editing application to extract the additional data from the one or more additional data objects comprises causing the digital content editing application to communicate with the data management software application or a database associated with the data management software application to retrieve the one or more additional data objects.

8. The computer-implemented method of claim 6, wherein causing the digital content editing application to insert the additional data into the digital report template comprises causing the digital content editing application to:

determine a selected format for inserting the additional data into the digital report template in connection with the selection of the insertion tool; and insert the additional data into the digital report template in the selected format.

9. The computer-implemented method of claim 6, wherein causing the digital content editing application to extract the additional data from the one or more additional data objects comprises:

determining an object identifier corresponding to a selected data element in the panel; and extracting the additional data from the one or more additional data objects by determining the one or more additional data objects and an attribute value corresponding to the additional data utilizing the object identifier.

10. A system comprising:

one or more digital data repositories comprising data corresponding to one or more data assets or one or more data processing operations of an entity; and a hardware computing system configured to:

provide, for display within a graphical user interface of a data management software application, an option to generate a digital report for the data of the one or more digital data repositories; and in response to a selection of the option to generate the digital report for the dataset comprising the data of the one or more digital data repositories via the graphical user interface of the data management software application:

generate a digital report template by:

accessing data objects generated for the data via a data extraction software application;

determining that a portion of the digital report template corresponds to a particular data type; and inserting placeholder content into the digital report template at a location of the portion of the digital report template;

provide the digital report template for display within a digital content editing application; and in connection with providing the digital report template for display within the digital content editing application, cause the digital content editing application to open a panel comprising a set of tools corresponding to the data management software application with data related to the digital report template.

11. The system of claim 10, wherein the hardware computing system is configured to generate the digital report template by further:

determining the data objects corresponding to the digital report based on one or more inputs indicating a report category for the digital report and the dataset associated with the one or more data assets or the one or more data processing operations; and accessing the data objects to determine attribute values corresponding to the report category and the dataset.

12. The system of claim 10, wherein the hardware computing system is configured to provide the digital report template for display within the digital content editing application by:

executing code to launch the digital content editing application from within the data management software application; and causing the digital content editing application to display the digital report template.

13. The system of claim 10, wherein the hardware computing system is configured to:

determine, via the set of tools of the panel in the digital content editing application, a request to insert additional data of the particular data type into the digital report template; and cause the digital content editing application to replace the placeholder content with the additional data in the digital report template.

14. The system of claim 13, wherein the hardware computing system is configured to:

access, in response to the request comprising a search query via the panel, an additional data object comprising an attribute value corresponding to one or more terms in the search query; and cause the digital content editing application to replace the placeholder content with the additional data by:

extracting the additional data from the additional data object; and causing the digital content editing application to insert the additional data from the additional data object into the digital report template in place of the placeholder content.

15. The system of claim 10, wherein the hardware computing system is configured to:

retrieve, in response to a request to insert additional data into a chart in the digital report template via the set of tools in the panel of the digital content editing application, an additional data object comprising the additional data;

generate the chart comprising the additional data from the additional data object; and cause the digital content editing application to insert the chart into the digital report template.

16. A non-transitory computer readable medium comprising instructions that, when executed by computing hardware, cause the computing hardware to:

determine, via a data management software application, a selection of an option to generate a digital report for a dataset representing one or more operations associated with an entity;

retrieve, in connection with the dataset, data objects representing data extracted from one or more digital data repositories of the entity via a data extraction software application;

generate, utilizing the data objects, a digital report template comprising the data extracted from the one or more digital data repositories of the entity, wherein generating the digital report template comprises:

determining that a portion of the digital report template corresponds to a particular data type; and inserting placeholder content into the digital report template at a location of the portion of the digital report template; and in response to the selection of the option:

launch a digital content editing application presenting the digital report template; and cause the digital content editing application to present a set of tools corresponding to the data management software application with data related to the digital report template.

17. The non-transitory computer readable medium of claim 16, further comprising instructions that, when executed by the computing hardware, cause the computing hardware to:

provide, for display within a web browser at a client device, the data management software application including the option to generate the digital report; and in response to the selection of the option, execute code to cause the client device to navigate from the data management software application in the web browser to the digital content editing application presenting the digital report template with a panel comprising the set of tools corresponding to the data management software application.

18. The non-transitory computer readable medium of claim 16, further comprising instructions that, when executed by the computing hardware, cause the computing hardware to:

determine, in response to a request to insert additional data into the digital report template via the set of tools, one or more additional data objects representing additional data extracted from the one or more digital data repositories; and cause the digital content editing application to insert the additional data into the digital report template.

19. The non-transitory computer readable medium of claim 18, further comprising instructions that, when executed by the computing hardware, cause the computing hardware to:

determine, in response to the request comprising a search query including one or more terms, the one or more additional data objects by matching the one or more terms of the search query to one or more object identifiers corresponding to the one or more additional data objects; and in response to the search query, cause the digital content editing application to display an indicator representing the additional data corresponding to the one or more additional data objects.

20. The non-transitory computer readable medium of claim 17, further comprising instructions that, when executed by the computing hardware, cause the computing hardware to:

determine, via the set of tools of the panel in the digital content editing application, a request to insert additional data of the particular data type into the digital report template; and cause the digital content editing application to replace the placeholder content with the additional data in the digital report template.

* * * * *